(No Model.) 2 Sheets—Sheet 1.
S. E. HUGHES.
AIR PUMPING APPARATUS.
No. 423,768. Patented Mar. 18, 1890.
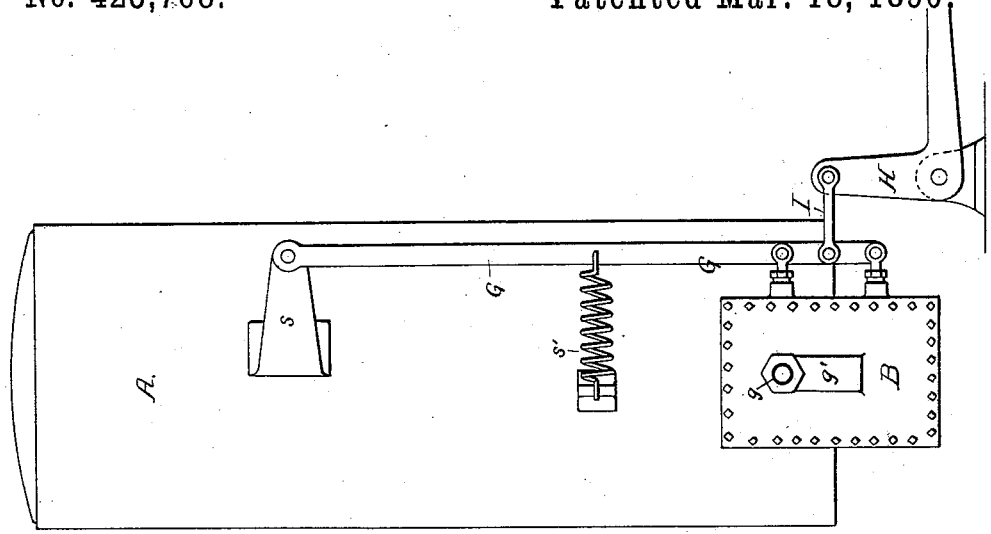
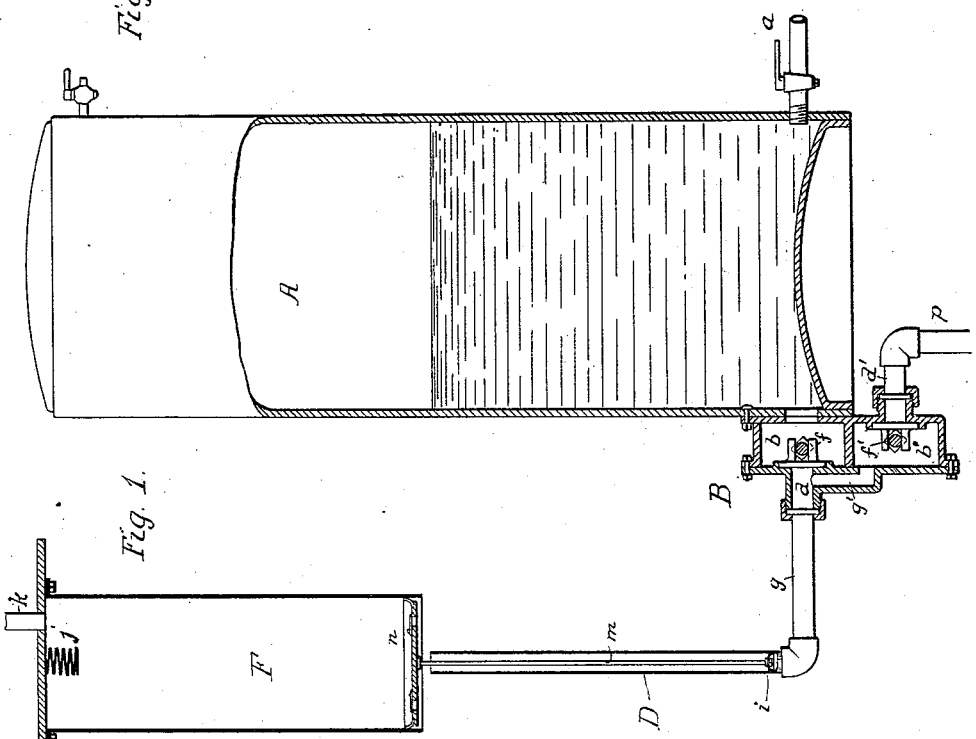
Witnesses:
A. V. Groupe.
John J. Leary
Inventor:
Smith E. Hughes
by his Attorneys
Howson & Howson (No Model.) 2 Sheets—Sheet 2.

S. E. HUGHES.
AIR PUMPING APPARATUS.

No. 423,768. Patented Mar. 18, 1890.

Witnesses:
O. V. Groupe.
John J. Geary

Inventor:
Smith E. Hughes
by his Attorneys,
Howson & Howson

UNITED STATES PATENT OFFICE.

SMITH E. HUGHES, OF PHILADELPHIA, PENNSYLVANIA, ASSIGNOR OF ONE-HALF TO MILO D. BALDY, OF SAME PLACE.

AIR-PUMPING APPARATUS.

SPECIFICATION forming part of Letters Patent No. 423,768, dated March 18, 1890.

Application filed July 18, 1889. Serial No. 317,897. (No model.)

*To all whom it may concern:*

Be it known that I, SMITH E. HUGHES, a citizen of the United States, and a resident of Philadelphia, Pennsylvania, have invented certain Improvements in Air-Pumping Apparatus, of which the following is a specification.

The object of my invention is to provide means whereby a flow of water or other liquid, limited in volume but under considerable pressure, may be utilized for causing an intermittent flow or blast of air of considerably greater volume but under much less pressure than the flow of liquid, and this object I attain in the manner which I will now proceed to describe, reference being had to the accompanying drawings, in which—

Figure 3:
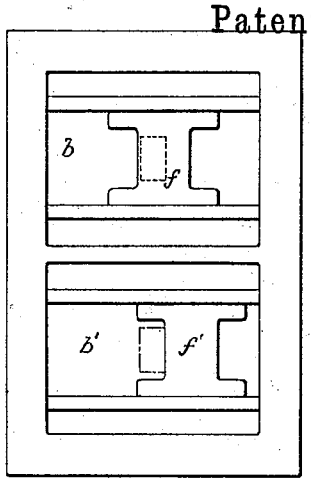
Figure 4:
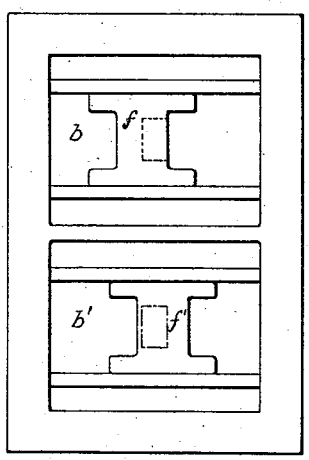
Figure 5:
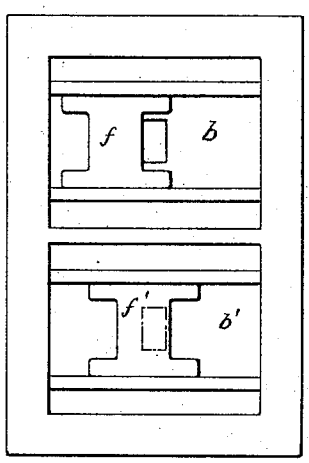
Figure 6:
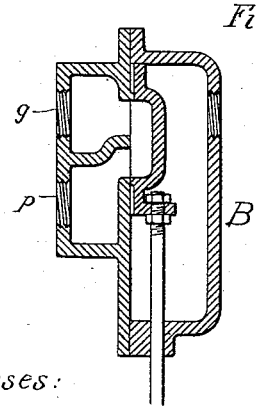
Figure 7:
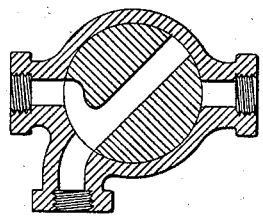

Figure 1 is a sectional elevation of apparatus embodying my invention. Fig. 2 is a view of the same, partly in elevation and partly in section, on the line 1 2, Fig. 1. Figs. 3, 4, and 5 are diagrams illustrating the operation of the valve mechanism forming part of the apparatus, and Figs. 6 and 7 are views illustrating modified forms of valve mechanism capable of use in the apparatus.

I may state in the outset that this apparatus has been devised as an adjunct to that form of pneumatic cash-carrier or delivery system requiring intermittent blasts or pulsations of air under comparatively light pressure in the pipes of the system, although the invention is not limited to this special purpose, but can be employed for utilizing the flow of water or other liquid under pressure—as, for instance, the ordinary water-supply of a city or town—for the purpose of storing or causing intermittent blasts of air for any desired use.

A represents a reservoir constructed so as to withstand the internal pressure to which it is subjected, this reservoir receiving a supply of water under pressure through a valved pipe $a$ and the water rising in the reservoir until the air above the same has been compressed until it exerts a pressure equal to that of the water. Near the bottom of the reservoir, at one side of the same, is a duplex valve-chest B, one chamber $b$ of which I term the "supply-chamber," this chamber being in communication with the reservoir A and receiving a supply of liquid therefrom. The chamber $b$ has an outlet $d$, controlled by a valve $f$, this outlet communicating through a pipe $g$ with the lower end of a cylinder D, in which is a piston $i$, the rod $m$ of the latter being connected to a piston $n$ in another cylinder F of considerably greater diameter than the cylinder D. The other chamber $b'$ of the duplex valve-chest B, I term the "discharge-chamber," and this chamber has an outlet $d'$, communicating with a discharge-pipe $p$, the outlet $d'$ being controlled by a valve $f'$, as shown in Fig. 1. The chamber $b'$ also communicates through a passage $g'$ with the outlet $d$, and thence through the pipe $g$ with the lower end of the cylinder D, so that when the valve $f$ is open and the valve $f'$ is closed water under pressure from the reservoir A will pass through the pipe $g$ and into the cylinder D, so as to drive upward the piston $i$, and thus impart a corresponding movement to the piston $n$ of the large cylinder F, the air within which above the piston is thus caused to escape through the discharge-pipe $k$ to cause the necessary blast or impulse of air in the carrier-pipe, or to enter a suitable reservoir, in which the air may be stored under pressure and in which it may be retained by the operation of an ordinary check-valve. On closing the valve $f$ and opening the valve $f'$ the water in the cylinder D beneath the piston $i$ is permitted to escape through the pipe $g$, passage $g'$, chamber $b'$, and pipe $p$, the pistons $n$ and $i$ descending in their respective cylinders, and this descent being facilitated in the case of the piston $n$ by forming openings therein provided with valves opening upward. Contact of the piston $n$ with the plate closing the upper end of the cylinder F is prevented by means of one or more springs $j$, secured to and depending from said plate, as shown in Fig. 1.

The valves $f\ f'$ are, by preference, so constructed that movement of both of the valves in one direction will cause the opening of the outlet $d$ and the closing of the outlet $d'$, while movement of the two valves in the opposite direction will effect the opening of the outlet $d'$ and the closing of the outlet $d$, the valves being so constructed and so located in respect to each other that the valve $f'$ will always close the outlet $d'$ before the valve $f$ opens the outlet $d$, and the latter outlet will always be closed by the valve $f$ before the valve $f'$ opens the outlet $d'$, as will be readily understood by reference to Figs. 3, 4, and 5 of the drawings, which represent the three different positions of the valves. This arrangement of the valves also permits of their operation by a single arm G, which, as shown in Fig. 2, is hung to a bracket $s$ on the reservoir A, and is acted upon by a lever H and link I in order to move the valves in one direction, a spring $s'$ serving to impart movement to the arm G in order to move the valves in the opposite direction.

It will be observed, on reference to Fig. 1, that the valves $f f'$ face in opposite directions, this construction being adopted because the flow of the water through the chambers $b b'$ is in opposite directions, so that the pressure of the water in each chamber tends to keep the valve to its seat. The use of two independent valves, however, is not absolutely necessary to the proper carrying out of my invention. For instance, a single valve controlling two ports, one leading to the pipe $g$, and the other to the pipe $p$, as shown in Fig. 6, for instance, may be employed, the objection to this construction, however, being the large area of valve exposed to the pressure of water from the reservoir A, whereas when the construction shown in Fig. 1 is adopted but one valve of small area is exposed to this pressure, the valve $f'$ being practically free from pressure, and consequently the valves can be moved with but slight effort.

A three-way valve—such, for instance, as shown in Fig. 7—may be used in some cases, if desired, in place of the two valves $f f'$. (Shown in Fig. 1.)

The use of a reservoir A, in which a supply of water can be stored under pressure, is important to the proper carrying out of my invention, for a sufficient volume of water can thus be maintained to permit the operation of the pump F a number of times in rapid succession, while the expansive force of the elastic body of air confined in the upper portion of the reservoir causes the water to enter the cylinder D with such force as to insure the desired quick movement of the piston $n$ of the pump.

Although I have shown a cylinder and piston as the means employed for pumping the air, it will be evident that a cylinder or like vessel with a flexible diaphragm or a structure in the nature of a pair of bellows may replace the same; hence they are to be considered as the equivalents of the cylinder and piston.

I am aware that air-pumping apparatus has been heretofore devised in which power and pump cylinders having connected pistons have been combined with a water-supply pipe, and with valve mechanism for governing the admission of water to and its discharge from said power-cylinder, and to such combination, broadly considered, therefore, I make no claim; but

I claim as my invention and desire to secure by Letters Patent—

1. The combination of a reservoir closed at the top, a water-supply pipe for said reservoir, the power-cylinder and pump-cylinder of different diameters, said power-cylinder being of much less capacity than the reservoir, connected pistons in said power-cylinder and pump-cylinder, a valve-chest communicating with the lower portion of the reservoir, and valve mechanism controlling the flow of water from the reservoir to the power-cylinder and the discharge of the water from said power-cylinder, substantially as specified.

2. The combination of a reservoir closed at the top, a water-supply pipe for said reservoir, the power-cylinder and pump-cylinders of different diameters, said power-cylinder being of much less capacity than the reservoir, connected pistons in said power-cylinder and pump-cylinder, a valve-chest having two independent chambers, one communicating with the power-cylinder and with the reservoir, and the other communicating with the power-cylinder and with a discharge-pipe, and two slide-valves, one in each chamber of the chest, one valve controlling the flow of water from the reservoir to the power-cylinder and the other controlling the flow from the power-cylinder to the discharge-pipe, substantially as specified.

3. The combination of a reservoir closed at the top, a water-supply pipe for said reservoir, the power-cylinder and pump-cylinder of different diameters, said power-cylinder being of much less capacity than the reservoir, connected pistons in said power-cylinder and pump-cylinder, a duplex valve-chest having independent supply and discharge chambers, and independent slide-valves in said chest, the valve in the supply-chamber facing in one direction and the valve in the discharge-chamber facing in the opposite direction, substantially as specified.

In testimony whereof I have signed my name to this specification in the presence of two subscribing witnesses.

SMITH E. HUGHES.

Witnesses:
WILLIAM D. CONNER,
HARRY SMITH.